Feb. 13, 1945.                T. McG. AIKEN                2,369,199
                              CAMERA DIAPHRAGM
                             Filed Dec. 1, 1941            2 Sheets-Sheet 1
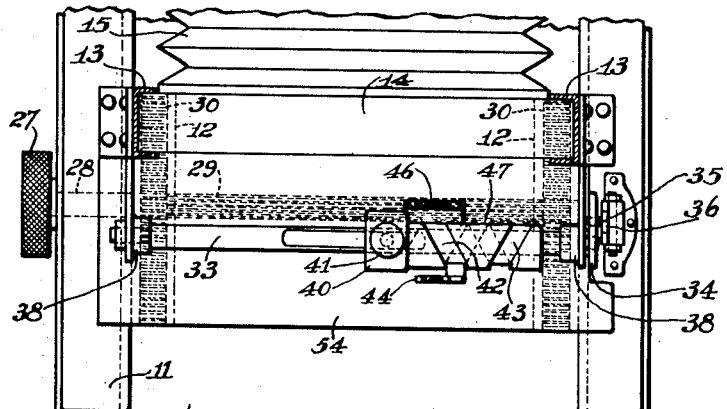
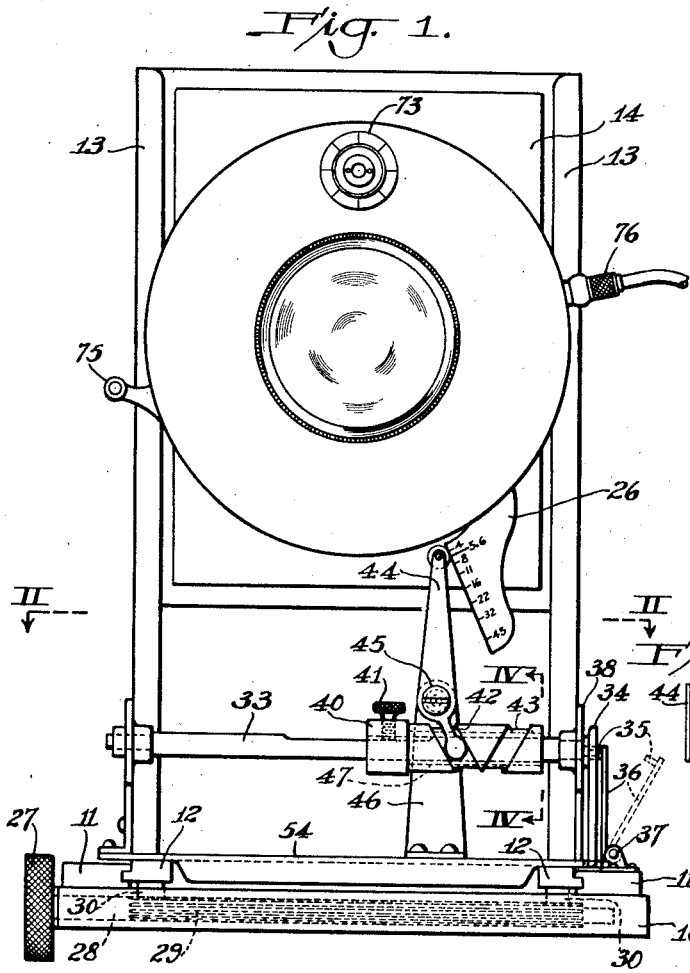
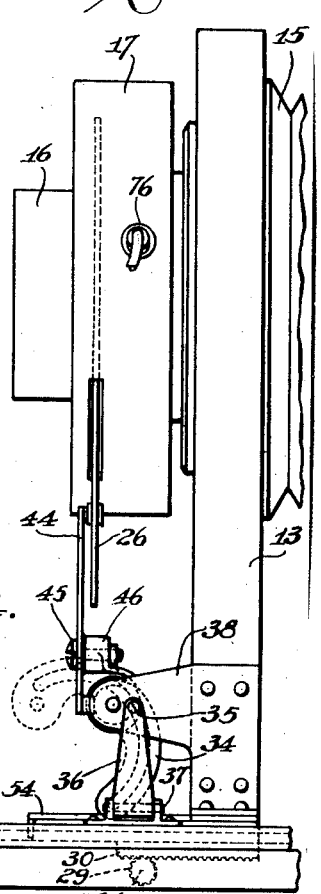
INVENTOR.
Thomas McG. Aiken
Archworth Martin
BY
ATTORNEY.

Feb. 13, 1945.　　　　T. McG. AIKEN　　　　2,369,199
CAMERA DIAPHRAGM
Filed Dec. 1, 1941　　　2 Sheets-Sheet 2
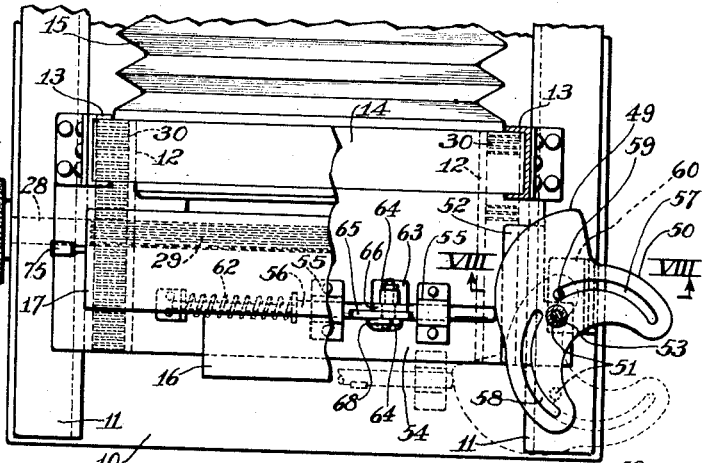
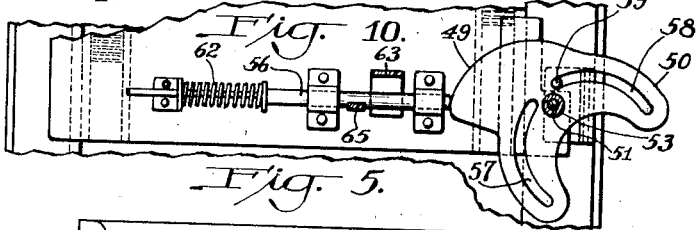
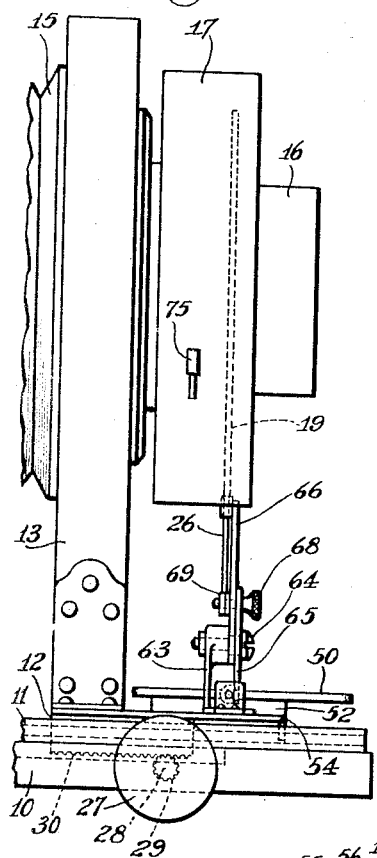
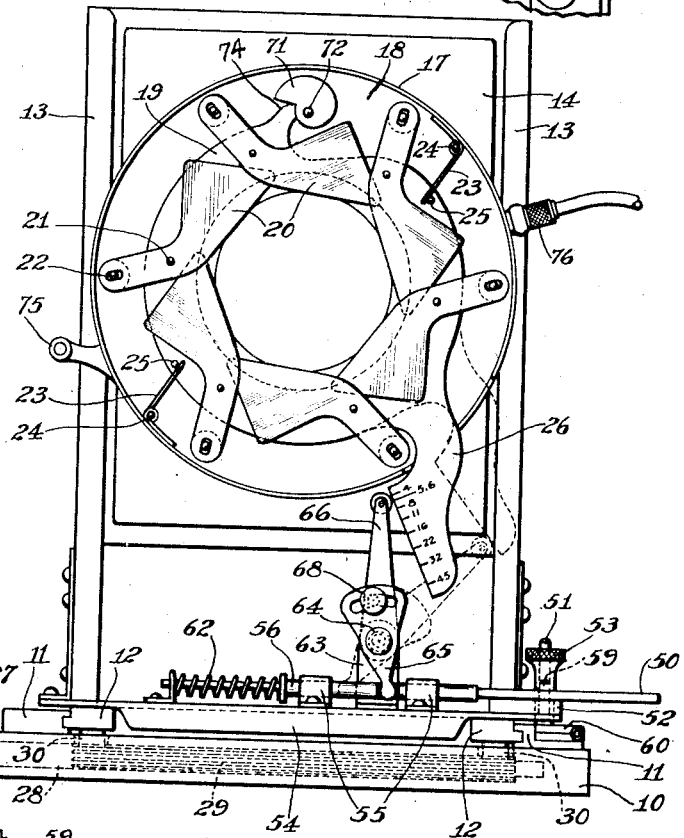
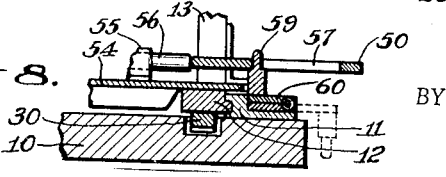
INVENTOR.
Thomas McG. Aiken
Archworth Martin
BY
ATTORNEY.

Patented Feb. 13, 1945

2,369,199

UNITED STATES PATENT OFFICE 2,369,199

CAMERA DIAPHRAGM

Thomas McG. Aiken, Pittsburgh, Pa.

Application December 1, 1941, Serial No. 421,147

8 Claims. (Cl. 95—64)

My invention relates to cameras, and particularly to the diaphragms thereof, including means for automatically adjusting the diaphragm "stop" through focusing.

In the taking of pictures by flashlamp illumination, at a given shutter speed, the stop openings must be made larger as the distances from the lamp to the object to be photographed are increased, because the intensity of the light on the object lessens as the distance increases. On the other hand, when photographing by daylight, the stop openings must be reduced as the distance of the object from the camera increases; this because the field of light within the focused area increases and therefore a greater amount of light passes through the lens to the sensitized surface and becomes concentrated on this relatively small area.

When photographing an object which is illuminated by a lamp positioned at the camera, the diaphragm opening must be greater when the object is located 100 feet from the lamp than when it is at a distance of only 25 feet, so that there will be sufficient light upon the plate or film. At a distance of 100 feet, the intensity of the light on the object will be much less than at 25 feet, and therefore a F.4 stop opening may be required, while at 25 feet a F.16 opening will be needed. Similarly, at a distance of six feet a F.64 opening may be sufficient, because at that distance, the object is much closer to the lamp and therefore there is greater intensity in illumination thereof. In photographing by daylight, the conditions are reversed, in that at the farther distances, the intensity of the light which enters the camera is greater because the field of illumination (at the focused area) is greater, so that at 100 feet an F.64 stop opening will be suitable, while at 6 feet an F.4 opening may be used, with corresponding changes in stop openings at intermediate and other distances.

My invention has for one of its objects the provision of means for automatically adjusting the diaphragm opening or stop position to the proper point through the operation of focusing the camera, in accordance with the light value at the distance of the focused object from the camera, whereby the optical value of the light on the film or plate is maintained at the same value throughout the entire range of focusing movements.

Another object is to provide apparatus which can be utilized to automatically adjust the area of diaphragm opening in a direction to increase the same as the distance from a camera and flashlamp to the object becomes greater, and can also be used to decrease the area of the diaphragm opening as the distance of the object from the camera becomes greater, in daylight photography.

Some forms of apparatus suitable for the practice of my invention are shown in the accompanying drawings wherein Figure 1 is a face view of the camera; Fig. 2 is a sectional view taken on the line II—II of Fig. 1; Fig. 3 is a side view of the apparatus of Fig. 1, showing a fragmentary portion of the camera; Fig. 4 is a view taken on the line IV—IV of Fig. 1; Fig. 5 is a view similar to Fig. 1, but with the front plate of the diaphragm casing removed and showing a modified form of mechanism for operating the diaphragm; Fig. 6 is a side view of the apparatus of Fig. 5; Fig. 7 is a sectional plan view of the structure of Fig. 5; Fig. 8 is a view taken on the line VIII—VIII of Fig. 7; Fig. 9 is a side view of a portion of the apparatus of Fig. 7, and Fig. 10 is a plan view showing the cam disc of Fig. 7 arranged for operating the diaphragm in making exposures by daylight.

Referring first to Figs. 1 to 4, I show the front portion of a camera which may be of conventional form except for the diaphragm-operating mechanism to be hereinafter described. The camera comprises the usual stationary bed 10, guide tracks 11, slide blocks 12 which are secured to a front standard 13, a lens board 14, bellows 15 and lens holder 16.

A diaphragm casing 17 is mounted on the lens board 14 and (as shown in Fig. 5) comprises a stationary ring or collar 18, an oscillatory ring 19 and diaphragm blades 20. The ring 19 fits within the ring 18 and will be oscillated therein by apparatus to be hereinafter described, to open and close the diaphragm blades 20. The blades 20 are pivotally supported on the ring 19 by studs 21 and each blade has a slot near its outer end into which extends a stud 22 carried by the ring or collar 18. It will be seen that as the ring 19 is oscillated, the blades 20 will be moved toward and from the center. Springs 23 carried by studs 24 and abutting against the circular wall of the collar 17 and studs 25 on the ring 19 serve to yieldably move the blades toward their wide-open position. The ring 19 carries an arm 26 that has scale marks thereon indicating various diaphragm stops.

In Figs. 1 to 4, the front standard 13 and the lens and diaphragm carried thereby are moved on the guide tracks 11 for focusing, by a knurled thumb wheel 27 on a shaft 28 that is journaled in the bed 10 and has gear teeth 29 formed thereon that mesh with racks 30 which are secured to the underside of the blocks 12, so that the standard 13 can be moved forwardly and rearwardly on the bed. A shaft 33 is journaled in the bearing brackets 38 that are on the movable frame of the camera and carries at its one end a curved slotted arm or plate 34 into whose slot extends a stud 35 that is carried by a bracket 36 which is pivotally mounted at 37 on one of the stationary guide rails 11. The bracket 36 can be swung into and out of operative position as may be desired. During focusing adjustments, the stud 35 will cause the shaft 33 to be oscillated.

A camming member 40 is carried by the shaft 33 and may be set at various longitudinally-adjusted positions thereon by a set screw 41 that has threaded engagement with the member 40 and abuts a flattened area on the shaft 33. The member 40 has helical slots 42 and 43 that are oppositely disposed with respect to one another and into either of which the lower end of a lever 44 may be placed. The lever 44 is pivoted at 45 to a bracket 46 which is mounted on the movable frame of the camera and carries an antifriction roller at its upper end that normally bears against the arm 26.

When the lever 44 has engagement with the slot 42 as in Figs. 1 and 3, forward movements of the frame 13 will result in counter-clockwise movement of the plate 34, which will rock the lever 44 clockwise, thus swinging the arm 26 counter-clockwise to push the diaphragm wings to a reduced opening. Rearward movements of the front standard 13 from an advanced position will rock the lever 44 in counter-clockwise direction, which will allow the arm 26 to be moved clockwise by the springs 23, thus opening the diaphragm wings further, for focusing distant objects by flashlight.

When it is desired to change the apparatus to be used for the taking of pictures by daylight, the set screw 41 is loosened and the sleeve 40 given a partial turn so that its flattened or cut-away surface 47 (Fig. 4) will come opposite to the lower extremity of the lever 44, whereupon the sleeve can be shifted relative to the lever, so as to bring its slot 43 into alignment with the lever 44, whereupon the sleeve will be turned to move the slot 43 into operative engagement with the lower end of the lever and set in that position by the screw 41. This adjustment of the sleeve will be so made that the arm 44 will be tilted to hold the arm 26 in its dotted line position (Fig. 5), so that the blades will be held nearly closed, for distance focusing. When the camera frame is thereafter shifted forwardly for focusing on closer objects, the arm 44 will be swung counter-clockwise, to permit movement of the blades by the springs 23, to farther open position.

The curvature of the slot in the plate 34, from its inner to its outer end, is on a constantly-increasing radius, so that the shaft 33 will be turned more rapidly when moving the standard 13 to focus the longer distances, than when the frame is moved further forwardly in focusing shorter distances. This arrangement is required because in cameras of this type, the adjusting movements of the lens-carrying frame are short for given changes in distance when focusing on distant objects relative to the movement required in focusing nearer objects over similar changes in distance. The shaft 33 and hence the lever 44 will, therefore, be rocked a given amount with respect to given changes in focusing distance, rather than in direct relation to the distance which the standard 13 is actually moved. In cameras having lenses which are of longer focal length, the length of the camming slot in the plate 34 will be increased and the radii thereof will be so made that the shaft 33 will be turned a certain amount for each definite change in focused distance. In other words, the camming slot will be so shaped that when changing the focused distance from 6 to 12 feet, for example, the shaft 33 will be rotated the same amount as when the focused distance is increased from 25 feet to 50 feet, or from 50 feet to 100 feet, although the frame 13 is actually shifted farther during focusing over the shorter distance than when focusing over the longer distance.

The slope of the camming surface on the arm 26, that is engaged by the lever 44 is such that the diaphragm blades will be caused to operate a predetermined distance upon each particular change in focusing distance, so that, as heretofore indicated, the stop opening of the diaphragm blades will be at perhaps F.4 for distances of 100 feet and F.16 for distances of 25 feet, etc.

In order to make adjustments so that the diaphragm may have selective stop openings at the various focused positions, the camming sleeve 40 is adjustable longitudinally of the shaft 33, so that although ordinarily a stop opening of F.16, for example, may be desired at a distance of 25 feet, the adjustment of the sleeve 40 in one direction or the other will produce a different stop opening at that distance and correspondingly different stop openings at other distances. These changes in "base" of stop openings are sometimes required because of differences in type of plates employed, flash bulbs, differences in shutter speeds, etc.

Referring now to Figs. 5 to 10, I show a camming disc 50 which is rotatably supported by a stud 51 upon a spacer washer 52 that is carried by the movable frame, the upper portion of the stud 51 being threaded for a nut 53 that can be removed to permit removal of the camming disc. The standard 13 carries a cross plate or bar 54 on which is secured guide sleeves 55 for a slide rod 56 whose outer end is engaged by the camming disc 50. The disc 50 has cam slots 57 and 58. When the disc is placed in the position shown in Figs. 7 and 8 the slot 57 will have engagement with a stud 59 that is carried by a bracket 60 which is hinged to one of the guide tracks 11, so that when the hand wheel 27 is turned to shift the standard 13 on the bed 10, the cam disc 50 will be oscillated on its pivot or stud shaft 51, to operate the push rod 56. A spring 62 yieldably holds the rod 56 against the cam disc 50.

A bracket 63 is secured to the cross piece 54 and carries a screw 64 that serves as a shaft on which is mounted a jointed lever that has arms 65 and 66 whose adjacent ends are pivotally connected to the shaft 64. The lever arms 65 and 66 are adjustably connected together by a screw 68 which is carried by the arm 66 and extends through an arcuate slot in the arm 65 and carries a nut 69 at the rear side of the arm 66. It will be seen that turning of the screw 68 to loosen the nut will permit of changing the relative angular positions of the lever arms 65 and 66. The arm 65, at its lower end, extends into a slot in the push rod 56. The lever 65—66 is thereby rocked on its pivot 64 when the rod 56 is shifted by the camming disc 50 or the spring 62.

The upper end of the lever arm 66 carries an anti-friction roller that normally engages the camming surface of the arm 26 that is carried by the diaphragm ring 19. It will be seen that when the cam disc 50 is moved by shifting of the frame 13, from its full line position (Fig. 7) to its dotted line position, the rod 56 will be pushed inwardly, moving the lever 65—66 clockwise, and the ring 19 will be shifted in a counterclockwise direction. The diaphragm blades 20 will thus be moved from a wide-open position toward a closed position. Similarly, when the camera frame is moved backwardly from the object being focused, the disc will be turned toward its full-line position, so that the diaphragm blades will be permitted to move toward their wide-open position under the influence of their springs 23.

It will thus be seen that when taking pictures by flashlight, with the lamp positioned near the camera, the camming disc 50 is so placed on its shaft 51 that the slot 57 will be engaged by the stationary stud 59, as shown in Fig. 7, and when the standard 13 is shifted during focusing, the camming surface 49 of the disc 50 will be caused to move past the push rod 56 so as to cause rocking of the lever 65—66. As shown in Figs. 5 and 7, the position of the parts is such that the diaphragm is wide open, which means that the object to be photographed is at a great distance from the camera. For shorter focusing distances, the standard 13 will be moved forwardly by the hand wheel 27, thus causing the camming disc 50 to be turned in a counterclockwise direction, by reason of its engagement with the stud 59. The slope of the camming surface 49 is such that it extends gradually farther from the axis 51 of the camming disc, thus moving the push rod 56 inwardly against the pressure of the spring 62. Since the lever 65—66 is rocked by the cam 50, in a clockwise direction, its upper end will move along the arm 26, thus pushing the diaphragm blades toward a contracted position, the distance of such movement depending, of course, upon the extent to which the camera is adjusted and the camming disc 50 turned. This gives the desired reduction in light at the shorter distances. When focusing from a shorter distance to a longer distance, the reverse action occurs, in that the rearward adjustment of the standard 13 will cause the disc 50 to be turned in a clockwise direction, thus permitting the spring 62 to push the push rod outwardly and rocking the lever 65—66 in a counter-clockwise direction, so that the diaphragm blades will be pushed farther open by their springs 23, when focusing on distant objects.

At times conditions of illumination or other conditions may be such that different stop openings than those named may be desired for these various distances. In that case, the adjusting screw 68 will be set to change the relative angularity of the lever arms 65 and 66. Shifting of the screw in one direction will so change the position of the arm 66 relative to the arm 65, that there will be a wider diaphragm opening, while adjustment in the reverse direction will provide for reduced diaphragm openings.

A gage member 71 is pivotally mounted at 72 in the diaphragm casing 17, and is turned by a button 73, in the path of a shoulder 74 that is carried by the ring 19. Ordinarily the gage member 71 will occupy the position shown in Fig. 5. When the automatic diaphragm setting apparatus is not in use, the cam 71 can be turned to push the blades toward a contracted position, against the tension of the springs 23, to secure a desired diaphragm "stop" opening.

Referring now to Fig. 10, I show the disc 50 in inverted position with respect to the showing in Fig. 7. In this instance, the disc will be employed in the taking of pictures by daylight, and the slot 58 in the disc will be placed over the stud 59. From this position, counterclockwise movement of the disc through forward adjustments of the camera to focus on closely-located objects will shift the camming surface 49 along the push rod 56 to allow the rod to move outwardly and permit the springs 23 to increase the diaphragm opening. Clockwise movements of the disc 50 when focusing on distant objects will effect movement of the push rod 56 inwardly and rocking of the ring 19 counterclockwise, thus effecting contraction of the diaphragm. The apparatus can be changed from flashlamp operation to daylight operation simply by removing the nut 53 and turning the disc 50 upside down, with its slot 58 placed in engagement with the stud 59.

The camming surface 49 of the disc 50 may suitably be of a constant radius throughout its length, if its center of curvature is eccentric to the axis of the disc 50, particularly if the camming slots 57 and 58 are of such curvature that the rod 56 will be slid a certain distance for each definite change in focusing distance, and the curvatures of the slots will be variously shaped so as to give this result with lenses of various focal lengths, as heretofore explained in connection with the camming member 34.

The diaphragm and the actuating apparatus therefor, as heretofore described, can be employed with shutters of various forms, including the shutter mechanism shown in my Patent 2,168,893. In the accompanying drawings, the shutter mechanism (not shown) is incorporated in the casing 17, and may be operated by setting and tripping elements 75 and 76, respectively, and other elements which have their counter-parts in my said patent.

A unique feature of my invention is that although focusing movements of the lens frame are necessarily of non-uniform distances with respect to focused distances, the diaphragm opening is nevertheless automatically adjusted in accordance with changes in the distance of the focused area (object) from the camera, so that the square of the diaphragm opening will be changed in accordance with changes in the focused area which is in a plane parallel to the sensitized surface. For example, if the focusing adjustment of the lens-carrying frame is changed from 25 feet to a distance of 50 feet, the frame must be shifted a greater distance than when adjusting from 50 feet to 100 feet focusing distance. The turning of the diaphragm ring will, however, be in direct relation to focused distances, and not in a direct relation to the actual distance of frame adjustment, thereby maintaining a uniform light value on the sensitized surface, at all positions of adjustment within the focusing range.

The invention is particularly useful in ordinary photographic work as distinguished from photoengraving work, because in the latter instance, the exposed area of the sensitized surface at the focal plane is continually changed in the making of enlargements and reductions, whereas, in the case of general photography, the exposed area at the focal plane is always the same, at all focused distances.

I claim as my invention:

1. The combination with a camera having a lens-carrying frame which is movable for focusing and a diaphragm carried by the frame, of a device for changing the stop position of the diaphragm, a cam having operative connection with said device, and means operable through focusing movements of the said frame, for operating the cam, the cam being adjustable as between two operative positions, in one of which it will cause movement of the diaphragm in one direction to vary the stop opening, upon focusing movement in one direction and in the other position will cause movement of the diaphragm in the opposite direction during the last-named focusing movement.

2. The combination with a camera having a lens-carrying frame which is movable for focusing and a diaphragm that is movable therewith, of a rotatable cam disc movable with the frame and having a pair of opposed camming surfaces, a stationary member radially offset from the axis of the cam and engageable with the camming surfaces, said surfaces each being curved along a line of constantly changing radius so that the cam disc will be turned at predetermined variable rates, through its engagement with said member, during to and fro focusing movements of the frame, an intermediate member actuated through turning of the cam disc, a second cam member connected to the diaphragm, for moving it to various stop positions, and an element movable with the intermediate member and having engagement with the camming surface of the second cam member, to move the cam member, the said element being adjustable relative to the cam member and the intermediate member, to change its zone of movement on the camming surface, and the last-named camming surface being of such angularity relative to the path of movement of the said element that the cam will be moved thereby at a predetermined variable rate relative thereto, within all its ranges of adjustment, the camming surfaces on the disc and the said cam member being of such contour that the area of diaphragm opening will be changed in definite squared relation to changes in the distance of focus.

3. The combination with a camera having a lens-carrying frame which is movable for focusing and a diaphragm that is movable therewith, of a rotatable cam disc movable with the frame and having a pair of opposed camming surfaces, a stationary member radially offset from the axis of the cam and engageable with the camming surfaces, said surfaces each being curved along a line of constantly changing radius so that the cam disc will be turned at predetermined variable rates, through its engagement with said member, during to and fro focusing movements of the frame, an intermediate member actuated through turning of the cam disc, a second cam member connected to the diaphragm, for moving it to various stop positions, and an element movable with the intermediate member and having engagement with the camming surface of the second cam member, to move the cam member, the camming surfaces on the disc and the said cam member being of such contour that the area of diaphragm opening will be changed in definite squared relation to changes in the distance of focus.

4. The combination with a camera having a lens-carrying frame which is movable for focusing and a diaphragm that is movable therewith, of a rotatable cam disc movable with the frame and having a pair of opposed camming surfaces, a stationary member radially offset from the axis of the cam and engageable with the camming surfaces, said surfaces each being curved along a line of constantly changing radius so that the cam disc will be turned at predetermined variable rates, through its engagement with said member, during to and fro focusing movements of the frame, a shaft connected to the disc and rotatable therewith, a second cam member connected to the diaphragm for moving it to various stop positions, and an element operated by said shaft and having engagement with the camming surface of the second cam member, to move the cam member, the said element being adjustable relative to the cam member and the shaft, to change its zone of movement on the camming surface, and the last-named camming surface being of such angularity relative to the path of movement of the said element that the cam will be moved thereby at a predetermined variable rate relative thereto, within all its ranges of adjustment, the camming surfaces on the disc and the said cam member being of such contour that the area of diaphragm opening will be changed in a definite squared relation to changes in the distance of focus.

5. The combination with a camera having a lens-carrying frame which is movable for focusing and a diaphragm that is movable therewith, of a rotatable cam disc movable with the frame and having a pair of opposed camming surfaces, a stationary member radially offset from the axis of the cam and engageable with the camming surfaces, said surfaces each being curved along a line of constantly changing radius so that the cam disc will be turned at predetermined variable rates, through its engagement with said member, during to and fro focusing movements of the frame, a third camming surface on the disc, a push rod actuated by said surface, a second cam member connected to the diaphragm, for moving it to various stop positions, and an element operated by said push rod and having engagement with the camming surface of the second cam member, to move the cam member, the said element being adjustable relative to the cam member and the push rod, to change its zone of movement on the camming surface, and the last-named camming surface being of such angularity relative to the path of movement of the said element that the cam will be moved thereby at a predetermined variable rate relative thereto, within all its ranges of adjustment, the camming surfaces on the disc and the said cam member being of such contour that the area of diaphragm opening will be changed in a definite squared relation to changes in the distance of focus.

6. The combination with a camera having a lens-carrying frame which is movable for focusing and a diaphragm that is movable therewith, of a rotatable cam disc movable with the frame and having a pair of opposed camming surfaces, a stationary member radially offset from the axis of the cam and engageable with the camming surfaces, said surfaces each being curved along a line of constantly changing radius so that the cam disc will be turned at predetermined variable rates, through its engagement with said member, during to and fro focusing movements of the frame, an intermediate member actuated through turning of the cam disc, a second cam member connected to the diaphragm, for moving it to various stop positions, and an element movable with the intermediate member and having engagement with the camming surface of the second cam member, to move the cam member, the said element being adjustable relative to the cam member and the intermediate member, to change its zone of movement on the camming surface, and the last-named camming surface being of such angularity relative to the path of movement of the said element that the cam will be moved thereby at a predetermined variable rate relative thereto, within all its ranges of adjustment, the cam having a second pair of opposed camming surfaces reversely arranged relative to the first pair, and the cam disc being adjustable on the frame, to selectively bring either pair of surfaces into cooperative relation with the said stationary member, the camming surfaces on the disc and the said cam member being of such contour that the area of diaphragm opening will be changed in a definite squared relation to changes in the distance of focus.

7. The combination with a camera having a lens-carrying frame which is movable for focusing and a diaphragm that is movable therewith, of a rotatable cam disc movable with the frame and having a pair of opposed camming surfaces, a stationary member radially offset from the axis of the cam and engageable with the camming surfaces, said surfaces each being curved along a line of constantly changing radius so that the cam disc will be turned at predetermined variable rates, through its engagement with said member, during to and fro focusing movements of the frame, an intermediate member actuated through turning of the cam disc, a second cam member connected to the diaphragm, for moving it to various stop positions, and an element movable with the intermediate member and having engagement with the camming surface of the second cam member, to move the cam member, the cam having a second pair of opposed camming surfaces reversely arranged relative to the first pair, and the cam disc being adjustable on the frame, to selectively bring either pair of surfaces into cooperative relation with the said stationary member, the camming surfaces on the disc and the said cam member being of such contour that the area of diaphragm opening will be changed in a definite squared relation to changes in the distance of focus.

8. The combination with a camera having a lens-carrying frame which is movable for focusing and a diaphragm that is movable therewith, of a rotatable cam disc movable with the frame and having a pair of opposed camming surfaces, a stationary member radially offset from the axis of the cam and engageable with the camming surfaces, said surfaces each being curved along a line of constantly changing radius so that the cam disc will be turned at predetermined variable rates, through its engagement with said member, during to and fro focusing movements of the frame, an intermediate member actuated through turning of the cam disc, a camming device operatively associated with the diaphragm, for moving it to various stop positions, and an element movable with the intermediate member, for operating the cam device, the said element being adjustable to change the zone of operation by the cam device with respect to the diaphragm, the camming surface of the said device being of such contour that the ratio of diaphragm movement will be maintained in a definitely harmonized relation to the said variable rates of disc movement, at all positions of adjustment, and the camming surfaces on the disc and the said cam device being of such contour that the area of diaphragm opening will be changed in definite squared relation to changes in the distance of focus.

THOMAS McG. AIKEN.